United States Patent

[11] 3,579,101

[72] Inventors Norbert L. Kusters;
 William J. M. Moore, Ottawa, Ontario,
 Canada
[21] Appl. No. 819,029
[22] Filed Apr. 24, 1969
[45] Patented May 18, 1971
[73] Assignee Canadian Patents and Development
 Limited
 Ottawa, Ontario, Canada

[54] ALTERNATING CURRENT APPARATUS FOR MEASURING CAPACITANCE OR PHASE ANGLE
7 Claims, 9 Drawing Figs.

[52] U.S. Cl. .................................................. 324/60
[51] Int. Cl. ........................................... G01n 11/52
[50] Field of Search ........................................ 324/60

[56] References Cited
UNITED STATES PATENTS
3,142,015  7/1964  Kusters et al. ................. 324/60

*Primary Examiner*—Edward E. Kubasiewicz
*Attorney*—Stevens, Davis, Miller and Mosher ABSTRACT: Apparatus of the current comparator type employs a magnetic core, with detection and compensating windings around the core shielded by a further magnetic core from outer ratio windings. A first series circuit is formed with one ratio winding and a capacitor to be measured; a second series circuit with the second ratio winding, a standard capacitor and a variable resistor. The series circuits are connected in parallel across an alternating potential with the currents in the ratio windings in opposition to generate only a difference flux in the cores. Turns of the compensating winding equal in number to the turns of the second ratio winding are connected in a closed series circuit with a third capacitor and a voltage proportional to the voltage drop across the resistor. Balance is detected by zero output from the detection winding. In-phase adjustment is obtained by varying the number of turns in the second ratio winding and hence in the compensating winding. Quadrature adjustment is achieved by the resistor.

Patented May 18, 1971

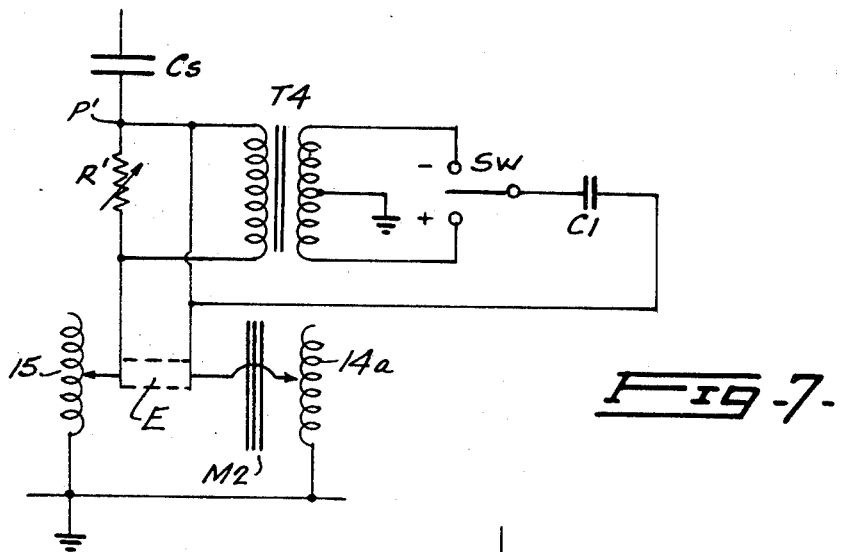
Fig-7-
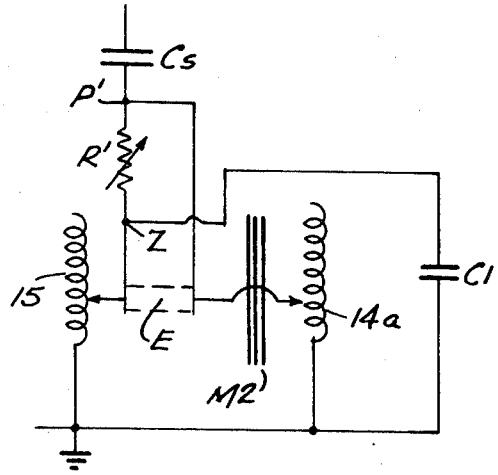
Fig.8.
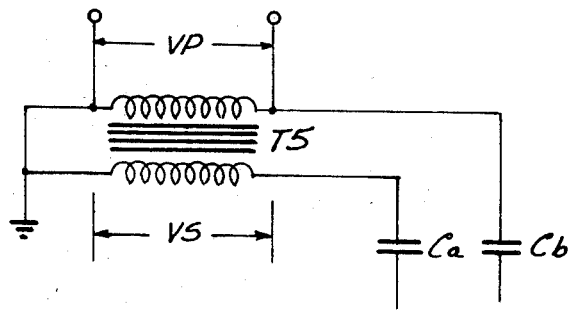
Fig.9.

ALTERNATING CURRENT APPARATUS FOR MEASURING CAPACITANCE OR PHASE ANGLE

This invention relates to an alternating current measuring apparatus that is especially useful for comparing and calibrating capacitors at high voltage. It is also usable for the comparison of the ratios and phase angles of the primary and secondary voltages in a voltage transformer.

More specifically, the present invention represents an improvement over the forms of apparatus shown in N. L. Kusters et al. U.S. Pat. No. 3,142,015 issued July 21, 1964, the object of the present invention being to provide a simplification of such apparatus.

By way of specific illustration of the invention, the accompanying drawings show a prior art circuit, and a circuit according to the present invention, as well as simplified versions of these two circuits to aid the comparison thereof, in addition to certain possible modifications. It is to be understood that the circuits according to the invention are shown by way of example only, and that variations therein may be made within the scope of the appended claims.

In the drawings:

FIG. 5 to 9 show modifications of the circuit of FIG. 3.

Figure 1:
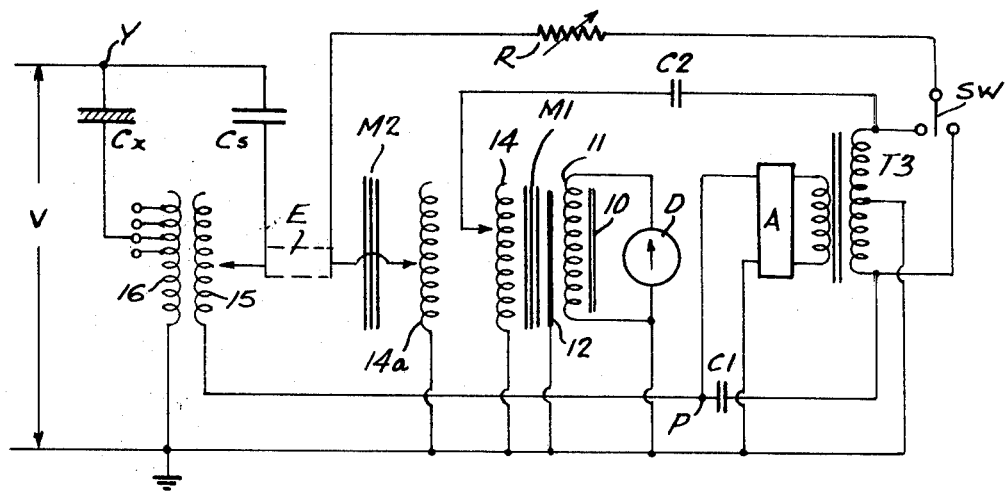
FIG. 1 is a prior art circuit, being essentially the same circuit as is illustrated in FIG. 3, as modified by FIG. 5, of said prior Kusters et al. patent.

The apparatus of which FIG. 1 shows the circuit consists basically of a current comparator device, toroidal in form, each of the cores shown being assumed to be closed on itself. At the axial center of the device is a magnetic core 10 around which there is located a detection winding 11 for indicating flux in the core 10 by means of a null detector D. Immediately radially outwardly of the winding 11 there is provided a copper electrostatic shield 12 that will be split along one edge in the usual way to avoid a shorted turn. This shield 12 protects the detection winding 11 from interference from stray electric fields.

There is then provided a first shielding magnetic core M1. First and second deviation windings 14 and 14a are located next, followed by a second shielding magnetic core M2. Finally, radially outwardly of the core M2 are positioned two ratio windings, secondary winding 15 and primary winding 16. The physical structure of the comparator device is now well known, being shown in FIG. 1 of said prior Kusters et al. patent, ratio windings 15 and 16 being so structurally arranged that the currents in them always flow in opposition to each other. Both windings 15 and 16 are assumed to be tapped for changing the turns ratio and obtaining adjustment of the in-phase components.

The primary and secondary windings 16 and 15 are respectively series connected with an unknown capacitor CX under test (assumed to be lossy) and a standard capacitor Cs (assumed to be loss-less). The series circuits so formed are connected together at one end at point Y to which is applied an alternating high voltage V relative to ground (ground being referred to in the claims generically as "a reference potential"). The other end of the winding 16 is connected directly to ground, while the other end P of winding 15 is connected through a capacitor C1 to one end of the secondary of a transformer T3, a center tap on which is grounded.

A high gain amplifier A has its input connected between point P and ground and its output feeding the primary of the transformer T3. The amplifier A acts as a feedback amplifier to cause the secondary of the transformer T3 to constitute a voltage source to bring the point P very nearly to ground potential. This condition is arrived at automatically. Balance with detector D is achieved by adjusting the tap on winding 15 (for coarse in-phase adjustment), by adjusting the tap on deviation winding 14 which is supplied through a capacitor C2 from the other end of the secondary of the transformer T3 (for fine in-phase adjustment), and by adjusting a variable resistor R (for quadrature adjustment). The resistor R is connected through a switch Sw to either polarity of the voltage across the secondary of the transformer T3, and is used to inject quadrature current into the second deviation winding 14a, the number of turns in use on the winding 14a being proportional to the number of turns in use on the winding 15, and the tap changing mechanisms of windings 14a and 15 being mechanically interconnected, as demonstrated by the broken lines E, in order to ensure maintenance of this proportionality.

Figure 2:
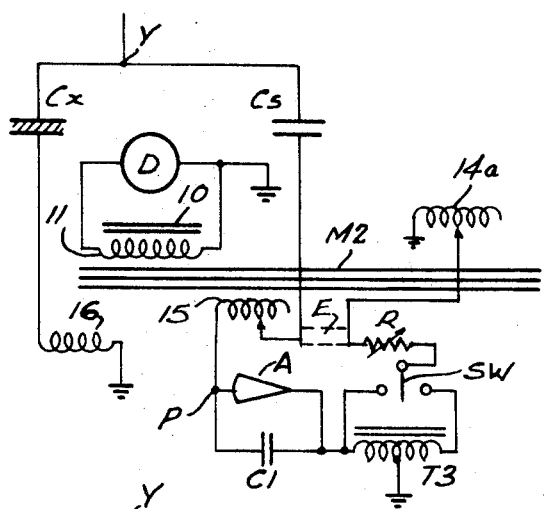
FIG. 2 is a simplified version of the circuit of FIG. 1 to aid understanding of the basic operation thereof.

FIG. 2 shows the basic components of the FIG. 1 circuit, similarly lettered, but with the shielding core M1 and winding 14 omitted. These latter parts are not fundamental to the circuit, the winding 14 merely providing an in-phase adjustment that is finer than it is usually convenient to obtain by taps on the winding 15, but which can theoretically be obtained at the winding 15.

Figure 3:
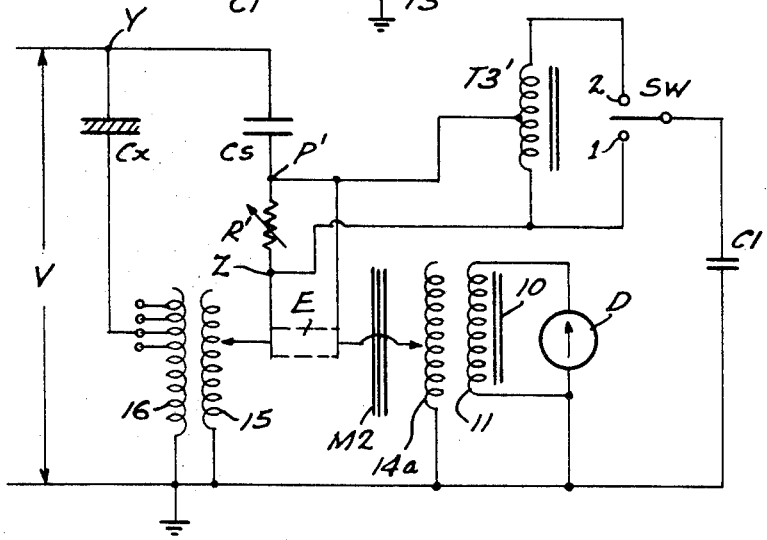
FIG. 3 is a circuit arrangement of apparatus constructed according to the invention.
Figure 4:
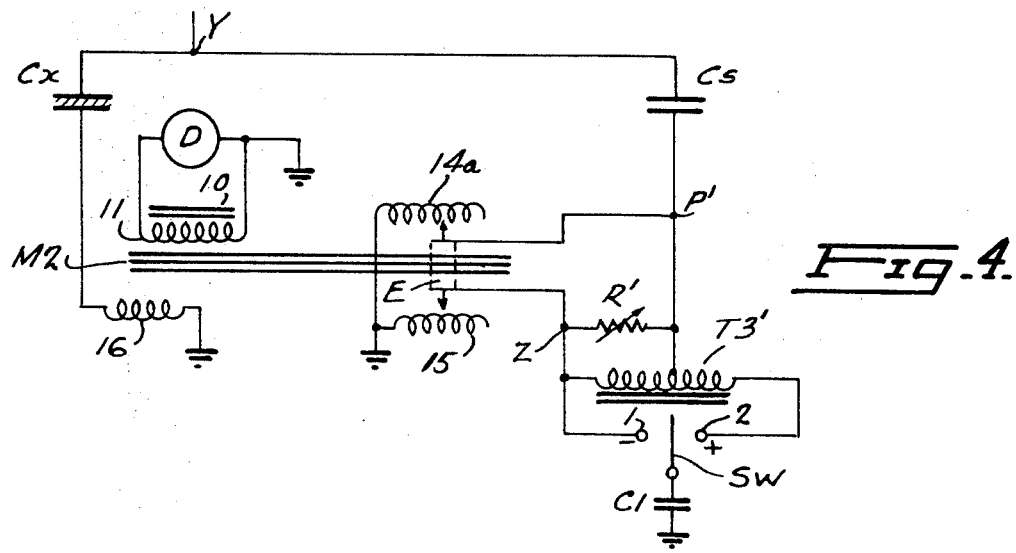
FIG. 4 is a simplified version of FIG. 3 for comparison with FIG. 2.

FIG. 3 shows a complete circuit according to the invention and FIG. 4 is the same circuit reduced to a form in which both its similarity to and its difference from the circuit of FIG. 2 become clearly apparent.

In FIGS. 3 and 4 the same symbols have been used to designate parts that are similar to those of the circuit of FIGS. 1 and 2, and further description of these parts is therefore deemed unnecessary. It will be noted that the winding 14 and shield M1 continue to be omitted. In the circuit of FIG. 3 the windings 15 and 14a must have the same number of turns as each other, independent of the position of the tap changing mechanism E, for which reason the winding 14a is now referred to as a compensating winding. A resistor R connected in series with the winding 15 is connected across one-half of the transformer T3' which now takes the form of an autotransformer. The tap on the winding 14a is connected to the common point of the resistor R' and the standard capacitor Cs; and one or other of the two ends of the transformer T3' can be connected through switch Sw to the capacitor C1, the other side of which is grounded.

It is believed that the operation of the circuit of FIGS. 3 and 4 will best be understood from a consideration of FIG. 4. In contrast to the prior art circuit of FIG. 1, an important feature of the new circuit resides in causing the magnetic shield M2 to perform a dual function. Firstly, it functions as a shield against unwanted electromagnetic interference with windings 11 and 14a and magnetic core 10. Secondly it serves with the ratio windings 16 as primary and 15 as secondary to form a current transformer. This current transformer ensures that most of the current passing through the capacitor Cs will also flow through the winding 15. The current passing through the winding 14a will consist of the error or magnetizing current of the current transformer formed by the winding 15 and 16 and the core M2, when the switch Sw is in position 2 (the position used for measuring a positive dissipation factor, i.e., with the capacitor Cx more lossy than the standard capacitor Cs). When the switch Sw is in position 1 (for measuring a negative dissipation factor), the current through the winding 14a consists of the same error or magnetizing current plus the current passing through the capacitor C1. Since the current in the winding 14a is very small, the voltage drop across it will be negligible and the point P' will be essentially held at ground potential. The burden on the current transformer consists of the resistor R' in parallel with the capacitor C1, and the voltage drop across this resistor is used with the voltage transformer T3' to drive current through the capacitor C1.

For balance at the detector D there must be no flux in the core 10, which means that the sum of the ampere-turns imposed by the currents in the windings 16, 15 and 14a must be zero. While the flux in the core 10 is the result of the combined effect of all the windings, the flux in the shielding core M2 is determined by the difference between the currents in windings 15 and 16 only. The core M2 does not "see" the winding 14a, but any such flux created in the core M2 generates a voltage in the winding 15 of such a nature as to tend to be equal and opposite to the voltage drop across resistor R', maintaining the point P' at essentially ground potential, i.e., by automatically varying the amount of current diverted into the winding 14a at the point P'. The effect of the winding 14a is hence very similar to that of the amplifier A of the prior art circuit, which automatically kept its input point P very nearly at ground potential. In-phase adjustment is obtained as before by means of the tap adjustment on winding 15, and quadrature adjustment, to achieve a final null at detector D, is achieved by means of the resistor R' which controls the amount of quadrature current that is injected from ground into the winding 15 at point Z (negative dissipation factor, switch Sw in position 1) or is bypassed to ground from the point P' (positive dissipation factor, switch Sw in position 2).

When the detector D shows a balance, the capacitance of the unknown capacitor will bear the same ratio to that of the standard capacitor as the ratio of the number of turns in use on the winding 15 to those in use on the winding 16. The dissipation factor of the unknown capacitor is equal to $\omega R'C1$, so that the apparatus is direct reading, provided the resistor R' is direct reading in resistance. In the former circuit, the direct reading facility of the apparatus required the resistor R to be direct reading in conductance.

However, the significant improvement that the new circuit offers over the former circuit is the ability to dispense with the amplifier without loss of its equivalent effect. The particular manner of connecting the winding 14a in FIGS. 3 and 4 enables a passive circuit to perform the same function as the amplifier A, while avoiding the need for the active component that the amplifier represents.

Figure 5:
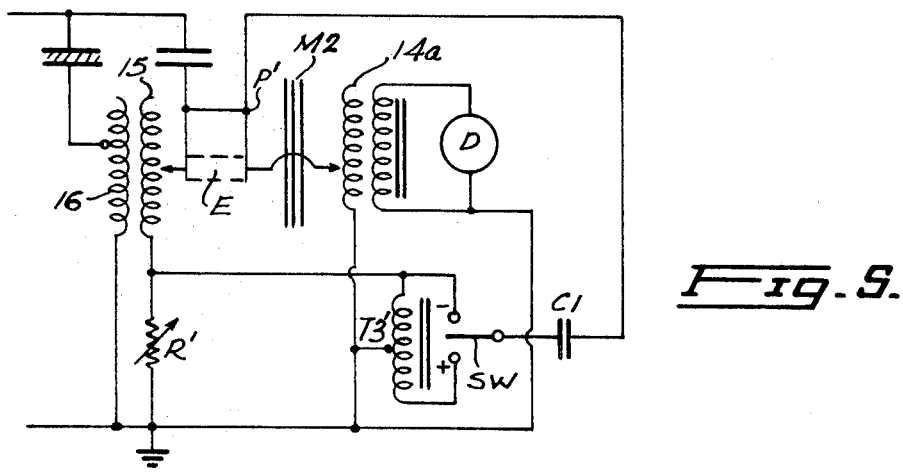

As an alternative to the arrangement shown in FIG. 3, the resistor R' can be arranged between the winding 15 and ground, as demonstrated by the modified form of circuit shown as FIG. 5. The voltage across the resistor R' is still connected across half the autotransformer T3' which thus continues to extend this voltage through zero to provide the desired choice of sign at the switch Sw which, as before, is connected to the capacitor C1. The other side of this capacitor is now connected to point P' which is common with the movable tap on the compensating winding 14a which is now both mechanically and electrically connected to the tap on the winding 15. As before, the current in winding 14a is very small, with the result that the point P' is again held very close to ground potential. As before, the mechanical connection is such as to ensure that windings 14a and 15 always have the same number of turns. The performance of this circuit is essentially the same as that of FIG. 3.

Figure 6:
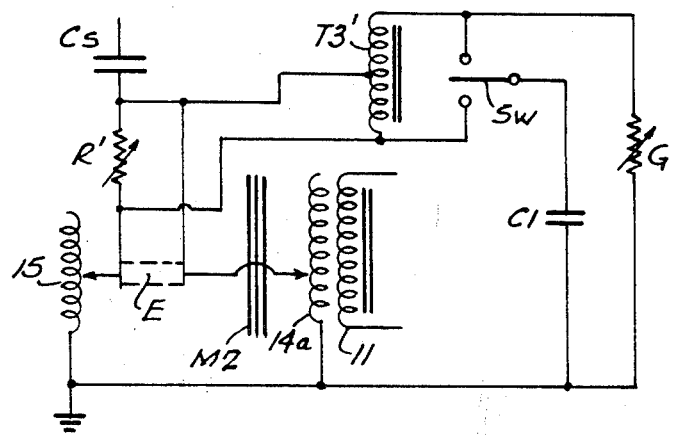

FIG. 3 can also be modified to include fine in-phase adjustment means, shown in FIG. 6. The circuit of FIG. 6 is identical to that of FIG. 3, except for an additional resistor which has been designated G because it is graduated in units of conductance to make the circuit direct reading. Resistor G can be adjusted to provide fin in-phase control.

FIG. 7 shows another modification of FIG. 3 in which the autotransformer has been replaced by a two winding transformer T4 having its primary across the resistor R' and its secondary connected through the switch Sw and the capacitor C1 to the winding 14a to function in essentially the same manner as FIGS. 3 and 4. Again point P' is held near ground potential, the current in winding 14a being small.

In those instances in which it is sufficient to be able to measure only negative dissipation factors, a transformer can be dispensed with altogether as demonstrated by FIG. 8 which shows a fragment of FIG. 3 modified to apply the point Z directly through the capacitor C1 to ground (the equivalent of FIG. 3 with the switch Sw permanently in position 1). The point P' continues to be connected to the winding 14a.

It will be noted that there are three essential requirements of the present invention, that are shared by each of the circuits of FIGS. 3 to 8, these requirements being i. The variable resistor R' is in series with a ratio winding 15;

ii. this ratio winding 15 and a compensating winding 14a, always having the same number of turns as each other, are connected together at an end of similar polarity (ground in FIGS. 3, 4, 6, 7 and 8: the movable taps in FIG. 5);

iii. one end of the compensating winding is connected to the reference potential (ground), while the other end of this compensating winding is connected through a series circuit to the reference potential, such series circuit comprising the capacitor (C1) and means supplying a voltage proportional to the voltage drop across the resistor (such means being the resistor itself in FIG. 8; the transformers and resistor in FIGS. 3 to 7).

Preferably, this requirement (iii) includes a method of achieving a reversal of sign to enable both positive and negative dissipation factors to be measured. This reversal feature necessitates use of a transformer, which may be an autotransformer (FIGS. 3 to 6), in which case the voltage across the resistor R' is extended through zero by the expedient of connecting the voltage from the resistor R' across one-half of the transformer winding while taking an output from a respective end of this winding depending on the sign required. Alternatively, a two winding transformer can be used (FIG. 7) in which case the voltage across the resistor R' is applied across the primary and a center tap on the secondary is grounded to provide a choice of sign at its respective ends of a voltage proportional to the drop across the resistor R'.

The circuits described herein may also be used for the comparison of the phase angles of two voltages, given a pair of capacitors of known values, in the same manner as explained in relation to FIG. 6 of said prior Kusters et al. patent. This application of the invention is shown in FIG. 9 where the capacitors Cs and Cx have been replaced by a pair of capacitors Ca and Cb. By applying the same voltage to these capacitors their relative values can be established by one of the circuits already described. With these values known, the apparatus is then operated in the manner indicated by FIG. 9 to determine the magnitude and phase relationship between two voltages, such as the primary and secondary voltages Vp and Vs of a voltage transformer T5 under test. The remainder of the FIG. 9 circuit will be as illustrated in FIG. 3, or as modified by one of FIGS. 5 to 8.

We claim:
1. Measuring apparatus comprising
   a. two capacitors,
   b. a current comparator device comprising
      i. a magnetic core closed on itself to form a magnetic circuit,
      ii. a detection winding around said core,
      iii. a compensating winding around said core,
      iv. shielding magnetic core surrounding said detection and compensating windings,
      v. and a pair of ratio windings around said shielding core,
   c. a variable resistor,
   d. means connecting one of said capacitors in series with one of said ratio windings to form a first series circuit,
   e. means connecting the other of said capacitors and said resistor in series with the other of said ratio windings to form a second series circuit,
   f. means connected to the detection winding for detecting zero output therefrom,
   g. means for connecting a first end of the first series circuit to a first alternating potential predetermined in relation to a reference potential,
   h. means for connecting a first end of the second series circuit to a second alternating potential of the same frequency as said first alternating potential an d also predetermined in relation to said reference potential,
   i. means connecting the second ends of the first and second series circuits to said reference potential to cause currents to flow in the ratio windings, the connections being such that said currents flow in opposition to each other to generate only a difference flux in the cores,
   j. a third capacitor, k. means for producing a voltage proportional to the voltage drop across said resistor, and
l. means for selecting the same number of turns of the compensating winding as the number of turns of said other ratio winding and for connecting such selected turns of the compensating winding between said reference potential and one end of a third series circuit, the other end of said third series circuit being connected to said reference potential, and said third series circuit comprising a series connection of said third capacitor and said voltage producing means (k).

2. Apparatus according to claim 1, wherein said voltage producing means (k) comprise terminals connected directly to respective ends of said resistor.

3. Apparatus according to claim 1, wherein said voltage producing means (k) comprise an autotransformer having a center tapped winding, means for selectively connecting the third capacitor to a respective one of the ends of said winding, and means for connecting said resistor between one such winding end and the center tap.

4. Apparatus according to claim 1, wherein said voltage producing means (k) comprises a two winding transformer having a primary winding and a center tapped secondary winding, the center tap thereof being connected to the reference potential, means for selectively connecting the third capacitor to a respective one of the ends of said secondary winding, and means for connecting said resistor across said primary winding.

5. Apparatus according to claim 1, wherein said first and second alternating potentials are identical to each other.

6. Apparatus according to claim 1, wherein said second series circuit extends from said second alternating potential through said other capacitor, then through said resistor and finally through said other ratio winding to said reference potential.

7. Apparatus according to claim 1, wherein said second series circuit extends from said second alternating potential through said other capacitor, then through said other ratio winding and finally through said resistor to said reference potential.